Oct. 25, 1949.    W. GRAF    2,486,020
GEAR GRINDING MACHINE
Filed Jan. 5, 1949    3 Sheets-Sheet 1
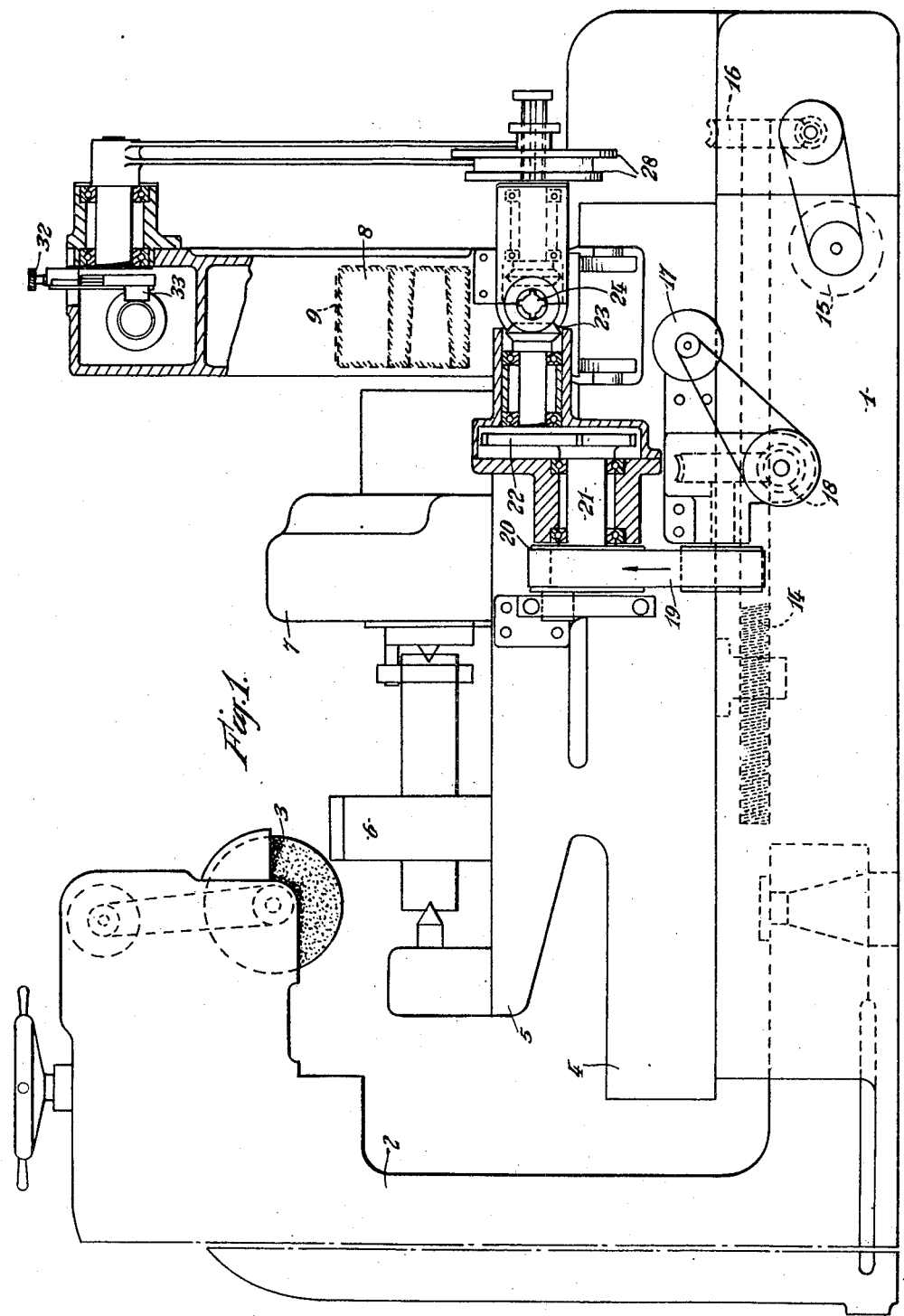
Willi Graf.
By Fraser, Myers & Manley Oct. 25, 1949.   W. GRAF   2,486,020
GEAR GRINDING MACHINE
Filed Jan. 5, 1949   3 Sheets-Sheet 2
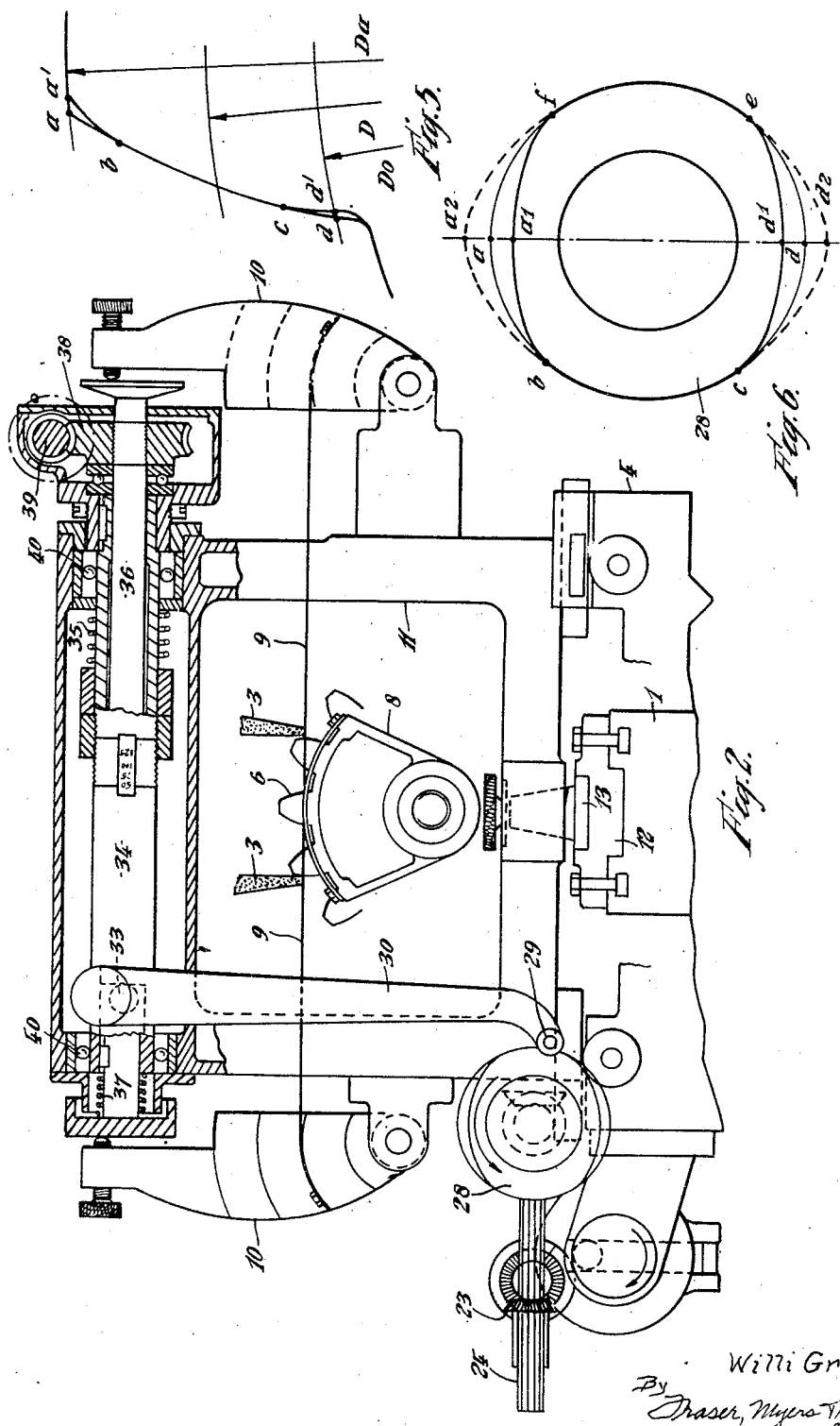
Willi Graf.
By Fraser, Myers Manley
Attys.

Oct. 25, 1949.  W. GRAF  2,486,020
GEAR GRINDING MACHINE
Filed Jan. 5, 1949  3 Sheets-Sheet 3
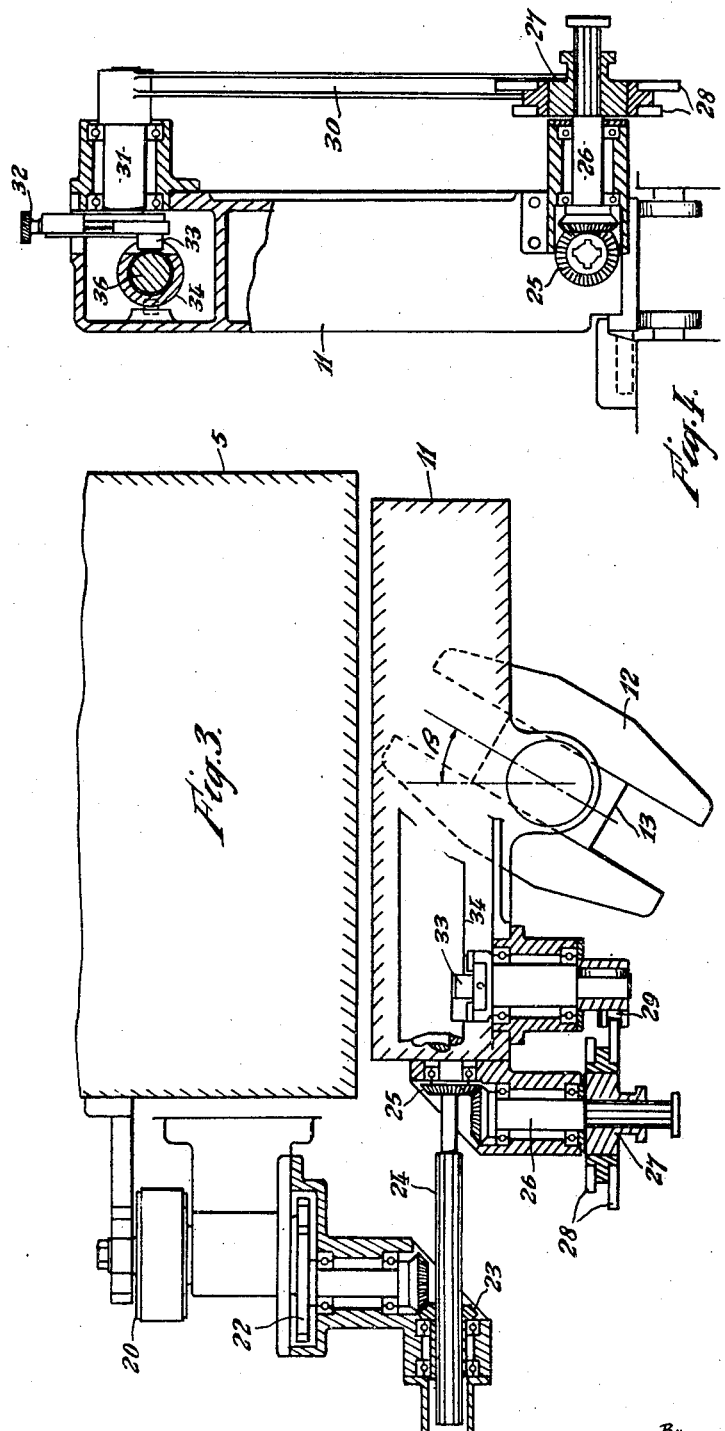
Willi Graf.
By Fraser, Myers & Manley
Att'ys.

Patented Oct. 25, 1949

2,486,020

UNITED STATES PATENT OFFICE 2,486,020

GEAR GRINDING MACHINE

Willi Graf, Zurich, Switzerland, assignor to Maag Zahnrader Und-Maschinen, A. G., Zurich, Switzerland, a company of Switzerland Application January 5, 1949, Serial No. 69,273
In Great Britain January 13, 1948

17 Claims. (Cl. 51—123)

This invention relates to gear grinding machines operating on the involute tooth generating principle for grinding the teeth on gear wheels or gear-generating cutters of the pinion type used in gear-shaping or planing machines.

It is known to employ an apparatus for this purpose in which the gear wheel or pinion cutter (hereinafter called the work) is fed into a rotating grinding tool having no bodily movement, the work being at the same time traversed across the grinding tool edge with a rolling motion which is derived from a cylinder fixed on the same spindle as the work and caused by the traversing motion of the spindle to roll without slipping on a plane surface. The plane surface is constituted by tensioned flexible steel tapes which, in order positively to prevent slipping, are passed partially round the circumference of the cylinder in opposite directions, one end of each tape being secured to the circumference of the cylinder, whilst their other ends are fixed in space, so that the tapes are, and remain at all times, perfectly taut. In this way, the work is caused to rotate while being traversed, the combined movement being a true rolling motion which enables the grinding tool to grind the teeth to true involute shape.

It happens, however, that the true involute form is not always the best form, because when two meshing gear wheels are driven under load, resilient deformation of the two teeth in engagement at any given moment is liable to occur, mainly at or near the tip of the driven tooth by bending, compression (flattening) and shearing stresses due to the gear pressure. The result is that, of each newly meshing tooth pair, the root of the driving tooth lightly touches the tip of the driven tooth. It has already been proposed to overcome this disadvantage by first cutting the teeth to approximately involute form, for example on a gear-shaping or a gear-hobbing machine, and then relieving the tips and/or roots of the teeth in the finish-grinding process, the flanks of each tooth being ground in such a way that its profile deviates slightly from the true involute form adjacent the tip or the root or both while the remainder of each flank is ground to true involute form.

The principal object of the present invention is to provide a grinding machine having improved means for producing such deviations from the involute tooth form.

This is achieved by movably associating the tape holder for the flexible tapes with a frame with respect to which and the grinding tools the slide for traversing the rolling cylinder and the work-supporting means is reciprocable, and by providing cam means mounted on said frame and driven by the drive causing the reciprocation of said slide, said cam means being adapted periodically to impart to said tape holder a movement relatively to said frame, thereby accelerating the rotary motion of the rolling cylinder and causing the combined traversing and rotary motion of the work to deviate from the true rolling motion.

As each tooth flank is being ground, the work is, as usual, slowly fed axially forward towards the grinding tool while being rapidly oscillated or rolled to and fro, and it is possible by correct choice of the operative faces of said cam means to ensure that, every time the work presents to the grinding tool edge that portion of the tooth flank adjacent the tip and/or root a little extra metal is removed at those places, thus causing them to deviate from the true involute form by the desired amount.

Another object of this invention is to make provision for adjusting this amount without having to change said cam means.

A further object of the invention is to provide a machine with which either straight or helical gear teeth may be ground to involute form with tip or root relief or both.

Other objects, features and advantages will become apparent from the following description of one form of gear grinding machine embodying the invention, reference being made to the accompanying drawings, wherein:

Fig. 1 is a part-sectional side elevation of the gear grinder;

Fig. 2 is a part-sectional end elevation of part of the machine showing the elements for producing the rolling motion;

Fig. 3 is a part-sectional top plan of that part of the machine shown in Fig. 2;

Fig. 4 is a sectional elevation of the part shown in Fig. 2, showing the top right-hand part of Fig. 1 in greater detail;

Fig. 5 is a diagrammatic representation of a tooth profile showing the deviations from the involute form at parts of the tooth flank, and Fig. 6 shows a cam disc for producing adjacent the tip and root such deviations from the involute tooth profile.

The gear grinder in the present embodiment of the invention is designed for providing tip and root relief deviating from the involute form and is suitable for finish-grinding either straight teeth or helical teeth of gear wheels or gear generating cutters of the pinion type, the teeth of which have been previously cut, for example by a hobbing or planing process. In the present example, the machine is shown as grinding a gear wheel.

As shown in Fig. 1, the machine comprises a bed 1 upon which is mounted on a vertical pivot a column 2 carrying the holder for the rotary grinding tools 3 of which there are two in the present embodiment, for a purpose which will hereinafter become apparent. Also mounted on the bed and displaceable longitudinally thereof is a slide 4 feeding the work towards the tool. A traversing slide 5 is mounted on the feed slide 4 and is adapted to be reciprocated thereon transversely of the machine. The traversing slide carries between centres the gear wheel 6 to be ground. The latter is connected, through a dividing or indexing device encased in a housing 7, to a part-cylindrical rolling body 8 which is rotatably mounted on a spindle co-axial with the gear wheel 6 and is adapted to rotate the latter. Details of the dividing mechanism contained in the housing 7 are not shown or described, as it is of known construction and operation and is not relevant to the present invention. Its function is of course to rotate the work by the width of one tooth when the grinding of one tooth has been completed and that of another tooth is to be begun.

As will be seen in Fig. 2, the rolling body 8 has flexible steel tapes 9 passed partially round its circumference, one end of each tape being secured to the body whilst their other ends are screwed on to a tape holder which in the present embodiment consists of two arms 10 between which and the body 8 the steel tapes are held in tension. The arms 10 are pivotally connected to a frame 11. As will be seen hereinafter, pivotal movement of the arms 10 is produced by cam means and is required for producing the desired deviation from the involute form of the tooth profile, and the arms are moved in unison for this purpose, but at other times they remain stationary. The frame 11 is mounted on the lower or feed slide 4 and is movable transversely thereof, being mounted on rollers for this purpose. Such transverse movement, which as will be seen is required only when gear wheels with helical teeth are being ground, is brought about by a guide 12 adjustably mounted on the machine bed 1 and having a groove engaged by a member 13 carried by a pin on the underside of the frame 11.

The drive for the parts of the machine so far described is provided for in the following manner, which can best be seen from Figs. 1 and 3. The feed slide 4 is fed forward slowly, parallel to the axis of the gear wheel being ground, by means of a lead screw 14 driven by a motor 15 through a worm gearing 16. Another motor 17 is mounted on the slide 4 and drives, through a worm gearing 18 and a belt 19, a crank 20. The latter, as shown in Fig. 3, is coupled to the traversing slide 5 and causes the latter, together with the work 6, the dividing mechanism 7 and the rolling body 8, to be rapidly rocked back and forth upon the lower slide 4, each revolution of the crank producing a complete back and forth traverse of the upper slide 5. The crank shaft 21 also drives gear wheels 22 and, through the latter, a bevel gearing 23 which in turn rotates a splined shaft 24 coupled through a bevel gearing 25 to a cam shaft 26. Slidably mounted on the outer extremity of the shaft 26 is a hub 27 which is keyed upon the shaft and which carries two cam discs 28. As will be apparent hereinafter one of these cams 28 is used when grinding one flank of a tooth and the other when grinding the opposite flank, so that only one of these cams is in use at a time. The hub 27 can be displaced upon the shaft 26 so that a cam roller 29 can be brought into engagement with whichever cam happens to be required. The cams 28 constitute the cam means referred to in the foregoing, and the manner in which they cause pivotal movement of the tape holder arms 10 will now be described, with particular reference to Figs. 2 and 4.

The cam roller 29 is carried on the end of a lever 30 which is pivoted in the frame 11. Its pivot pin 31 carries at its free end a coupling member 33 which is eccentric with respect to the axis of the pivot and the degree of eccentricity of which can be adjusted by means of a screw 32. The coupling member 33 therefore moves in unison with the lever 30, and the device 30, 31, 33 acts as a two-armed lever. The coupling member 33 is engaged in a recess provided in a sleeve 34 which is mounted for axial sliding movement in the frame 11 and is urged into engagement with the coupling member 33 by a spring 35 supported between a part of the frame 11 and a collar on the sleeve 34. Extending through and keyed to the sleeve 34 is a shaft 36, the ends of which project from the frame 11 and carry plates upon which the tape holder arms 10 abut. The shaft 36 is threaded near one end thereof, and the threaded portion has mounted thereon a nut 38 which takes the form of a worm-wheel and is engaged by a worm 39, the worm gearing 38, 39 being encased in an extension of the sleeve 34. A spring 37 urges the shaft 36 to the left (as viewed in Fig. 2) with respect to the sleeve 34 so that the worm-wheel 38 is held against an axial thrust bearing provided at the adjacent end of the sleeve 34. The object of the worm gearing 38, 39 is to enable the tape holder arms 10 to be initially adjusted before the grinding operation commences. Manual rotation of the worm 39 causes the shaft 36 to be slightly displaced longitudinally within the sleeve 34, thereby pivoting the tape holder arms and rotating the rolling body 8 just enough to move the flank of the gear tooth being ground into contact with the appropriate grinding wheel. The sleeve 34 is mounted for axial displacement in the frame 11 by means of ball bearings 40 and when the machine is in operation, the axial movements imparted to the sleeve by the coupling member 33 are transmitted to the shaft 36 which rocks the arms 10 accordingly.

The operation of the machine will first of all be described in connection with the grinding of straight teeth. For this purpose the column 2 is swung on its pivot so that the grinding wheel faces are parallel to the axis of the work (e. g. the gear wheel which is being ground). Also the guide 12 is adjusted so that the angle β (Fig. 3) is zero, and the frame 11 therefore makes no transverse movement but is fed forward by the lower slide 4 in a direction parallel to the axis of the work. As the lower slide 4 is fed forward, the upper slide is rapidly reciprocated transversely of the lower slide so that a very large number of reciprocations occur in the time that the lower slide has moved forward by an amount equal to the thickness of the tooth being ground. This causes the body 8 to roll along the steel tapes 9 which will be assumed to be stationary for the moment. The diameter of the rolling body 8 is equal to the base circle diameter $D_0$ of the tooth (Fig. 5). The resulting rotation of the body 8 is imparted to the work, and, combined with the traversing motion thereof, represents a true rolling motion thereof across the grinding wheel edges so that the latter grind the tooth flank to involute form. It is always the same narrow rim of the grinding wheel face which is in contact with the tooth flank and which constitutes the grinding edge (see Fig. 2).

It is however desired that the portions of the tooth flank adjacent the tip and root are to be relieved so as to deviate from the involute form, as shown in Fig. 5. The part of the flank in the region of the pitch circle (with diameter $D$), namely the part from point $b$ to point $c$ is to be of true involute form, whilst the tip relief begins at $b$ and increases till it reaches the amount $a$—$a'$ at the tip circle (diameter $D_a$). The root relief begins at $c$ and continues to the point $d'$ on the base circle (diameter $D_0$) below which the involute form is not in case produced. The amounts of relief $a$—$a'$ and $d$—$d'$ have been purposely shown exaggerated in Fig. 5 for greater clearness. They correspond to the flattened portions $a$—$a^1$ and $d$—$d^1$ of the operative face of the cam disc 28 shown in Fig. 6.

In order for the part $b$—$c$ of the tooth flank to be of true involute form, the tape holder arms 10 must remain stationary while this part is being ground. For this reason, the cam face $c$—$b$ (Fig. 6) is cylindrical and concentric with the cam axis so that the cam does not move the lever 30. When the narrow grinding wheel rim reaches the point $b$ of the tooth flank at which the tip relief is to begin, then it is necessary for the gear wheel 6 to receive a gradually increasing additional rotation to the left as viewed in Fig. 2 (assuming that the grinding of a left-hand tooth flank is being considered, i. e. by the left-hand grinding wheel 3 shown in Fig. 2). Accordingly the cam face begins to be flattened at point $b$, Fig. 6, the degree of flattening reaching its maximum at point $a^1$, so that the lever 30, urged by the spring 35, follows this cam contour and swings a little to the left, the sleeve 34, shaft 35, arms 10 and tapes 9 all executing similar movements to the left, whereby the rotation of the rolling body 8 and of the work 6 is temporarily accelerated, the latter therefore moving farther to the left by the time the cam roller is in contact with the point $a^1$ of the cam than it would have done but for this flattened contour of the cam. When the cam roller 29 is riding on the point $a^1$ of the cam face, the grinding wheel rim has reached the tip circle point $a'$ of the tooth profile. The reciprocation of the traversing slide 5 is now reversed so that the grinding wheel works back along the tooth flank portion $a'$—$b$, but the cam 28 continues to rotate without change of direction, and the cam face portion $a^1$—$f$ (Fig. 6) is now operative, the gradually decreasing degree of flattening thereof finding expression in the lessening of the amount of relief from the point $a'$ back to the point $b$ of the tooth flank. From $f$ to $e$, Fig. 6 the cam face is circular again, and the tape holder remains stationary while the grinding wheel works once more on the involute flank portion $b$—$c$. The flattened cam face $e$—$d^1$—$c$ in a similar manner produces the root relief $c$—$d'$, Fig. 5.

When one left-hand tooth flank is completely finished, the dividing mechanism 7 causes the work to be rotated to present another left-hand tooth flank to the grinding wheel, and so forth. When the left-hand flanks of all teeth have been ground, the mechanism is adjusted for grinding all the right-hand flanks in succession. For this purpose the cam roller 29 is disengaged from its cam, and the hub 27 displaced on the shaft 26 until the came roller can be engaged with the other cam 28. The latter has, instead of the flattened portions of its companion, raised portions, as indicated in dotted lines in Fig. 6, which deviate from the circular form of the portions $b$—$c$ and $e$—$f$ by the amounts $a$—$a^2$ and $d$—$d^2$. These raised cam face portions $b$—$a^2$—$f$ and $e$—$d^2$—$c$ produce small deflections of lever 30 and sleeve 34 to the right (as viewed in Fig. 2) against the pressure of the spring 35 and, as will be appreciated, this produces, in like manner as already described above, the additional rotation of the work to the right (Fig. 2) necessary, as can be seen, in order to remove the extra amount of material near the tip and root of the right-hand tooth flank which in Fig. 2 is shown as being worked upon by the right-hand one of the two grinding wheels. It will be seen that only one of the two grinding wheels is in operation at a time, one being for the purpose of grinding the left-hand flanks of all the teeth, and the other for grinding all the right-hand tooth flanks. As will be seen in Fig. 2, the wheel which is not in use (right-hand one) is set back a little to clear the adjacent (right-hand) tooth flank so as not to operate thereon.

The operation of the machine when grinding gear wheels with helical teeth is substantially the same, the only difference being that the column 2 is turned on its pivot to set the faces of the grinding wheels at an angle with the axis of the work equal to the desired helix angle $\beta$ and that the guide 12 is likewise adjusted to form this angle $\beta$ with the direction of feed of the lower slide 4 (it is shown as adjusted to this position in Fig. 2) so that, as the frame 11 moves forward with the lower slide, it is also displaced laterally and, while advancing towards the grinding wheels, moves progressively further away from the axis of the work. This of course imparts the same lateral movement to the steel tapes 9, and the effect, as will be apparent, is progressively to displace the arc through which the rolling body 8 and the work oscillate along its own curvature so that the work is gradually turned along a helical path of helix angle $\beta$ as it is fed forward into the grinding wheel, the operative rim of the latter thus grinding the tooth to helical form with respect to the axis of the work. The lateral movement of the frame does not affect the drive of the cam 28 mounted thereon because the splined shaft 24 slides within the associated bevel wheel of the gearing 23.

Notwithstanding this lateral displacement of the frame, therefore, the removal of extra material to provide tip and root relief begins at the same points $b$ and $c$ respectively of the tooth profile, as shown in Fig. 5, and proceeds to the same points $a'$ and $d'$, since the cam continues to operate in the same timed relationship to the rolling oscillations of the work wherever the arc of oscillation may be situated in the course of the forward feed.

It will be appreciated that, while a preferred embodiment of the invention has been disclosed herein, many changes may be made in the combination and arrangement of parts and in the details of construction thereof without departing from the spirit of the invention which is therefore not to be regarded as limited otherwise than by the scope of the appended claims.

What I claim and desire to secure by Letters Patent is:

1. In a gear grinding machine, the combination with stationarily mounted rotary grinding tool means, rotary work supporting means, and a rotary body having an at least partly cylindrical circumference and coupled to said work supporting means for causing rotation thereof, of a frame, tape holder means movably mounted on said frame, flexible tapes connected under tension between said tape holder means and the circumference of said body, a slide carrying said work supporting means and said body and mounted for movement relatively to said grinding tool means and said frame in a direction transversely to the axis of said body, driving means for reciprocating said slide in said direction and rolling said body along said tapes to cause the work to roll across said grinding tool means with true involute generating motion in the absence of relative movement between said tape holder means and said frame, cam means mounted on said frame, coupling means operatively associated with said driving means and said cam means for driving the latter, and transmission means operatively associated with said cam means and said tape holder means for causing periodic movement of the latter relatively to said frame to accelerate the rolling motion of said body along said tapes and cause the rolling motion of the work across said grinding tool means to deviate from the true involute generating motion.

2. In a gear grinding machine, the combination claimed in claim 1, said cam means including at least two differently shaped cams, and a common support for said cams mounted on said frame for adjustment to bring said cams selectively into operative association with said transmission means.

3. In a gear grinding machine, the combination claimed in claim 1, said transmission means including manually operable means for adjusting the ratio of transmission of movement from said cam means to said tape holder means.

4. In a gear grinding machine, the combination claimed in claim 1, said transmission means including a spring-loaded device slidably mounted in said frame for movement by said spring loading in one direction and by said cam means in the opposite direction, and said tape holder means including arms pivotally connected to said frame and operatively engaged by said device so as to be rocked by the movement thereof in either direction.

5. In a gear grinding machine, the combination claimed in claim 1, further comprising manually operable means for causing initial movement of said tape holder means relatively to said frame to bring the tooth flanks of the work into contact with said grinding tool means.

6. In a gear grinding machine, the combination with stationarily mounted rotary grinding tool means, rotary work supporting means and a rotary body having an at least partly cylindrical circumference and coupled to said work supporting means for causing rotation thereof, of a frame, at least two tape holder arms pivotally connected to said frame, flexible tapes connected under tension between said tape holder arms and the circumference of said body, a slide carrying said work supporting means and said body and mounted for movement relatively to said grinding tool means and said frame in a direction transversely to the axis of said body, driving means for reciprocating said slide in said direction and rolling said body along said tapes to cause the work to roll across said grinding tool means with true involute generating motion in the absence of relative movement between said tape holder arms and said frame, cam means mounted on said frame, coupling means operatively associated with said driving means and said cam means for driving the latter, a sleeve non-rotatably mounted in said frame for axial sliding movement with respect thereto, first resilient means urging said sleeve axially in one direction, a device for periodically transmitting movement from said cam means to said sleeve to move the latter axially in the opposite direction counter to said first resilient means, a shaft non-rotatably mounted within said sleeve for limited axial sliding movement with respect thereto, second resilient means cooperating with said sleeve and said shaft to cause the latter normally to move axially in unison with said sleeve, the ends of said shaft projecting from said sleeve and engaging said tape holder arms so that axial movement of said shaft in either direction causes rocking movement of said tape holder arms relatively to said frame to accelerate the rolling motion of said body along said tapes and cause the rolling motion of the work across said grinding tool means to deviate from the true involute generating motion, said shaft having a screw-threaded portion, and a nut mounted on said threaded shaft portion for manual rotation thereon but secured against axial movement relatively to said sleeve, said nut, when manually rotated, causing limited axial movement of said shaft with respect to said sleeve, either counter to, or assisted by, said second resilient means, for initial rocking movement of said tape holder arms to adjust the work for operative engagement of its tooth flanks with said grinding tool means.

7. In a gear grinding machine, the combination claimed in claim 6, said device including a two-armed lever fulcrumed on said frame and having one arm in engagement with said cam means for periodic operation thereby to cause rocking movement of said lever about its fulcrum, a coupling member adjustably carried by the other arm of said lever and engaging said sleeve for causing rocking movement of said lever about its fulcrum when said sleeve moves axially in said one direction, and for moving said sleeve axially in said opposite direction when said one lever arm is operated by said cam means, and manually operable means for adjusting the position of said coupling member on said other lever arm to vary the ratio of the effective lengths of said lever arms and, hence, the ratio of transmission of movement from said cam means to said sleeve.

8. In a gear grinding machine, the combination with stationarily mounted rotary grinding tool means, rotary work supporting means, and a rotary body having an at least partly cylindrical circumference and coupled to said work supporting means for causing rotation thereof, of a frame, at least two tape holder arms pivotally connected to said frame, flexible tapes connected under tension between said tape holder arms and the circumference of said body, a slide carrying said work supporting means and said body and mounted for movement relatively to said grinding tool means and said frame in a direction transversely to the axis of said body, driving means for reciprocating said slide in said direction and rolling said body along said tapes to cause the work to roll across said grinding tool means with true involute generating motion in the absence of relative movement between said tape holder arms and said frame, a device slidably mounted in said frame and having opposed extremities thereof engaged by said tape holder arms, a shaft rotatably mounted in said frame and driven by said slide driving means, a hub member slidably keyed on said shaft, at least two differently shaped cams carried by said hub member, either of said cams being capable of being moved into an operative position by sliding said hub member on said shaft, and selectively variable-ratio transmission means including an element for engagement with one of said cams which is in operative position and an element for engagement with said device for periodically imparting sliding movement to said device to cause pivotal movement of said tape holder arms relatively to said frame and consequential acceleration of the rolling motion of said body along said tapes and deviation, by a selectively variable amount, of the rolling motion of the work across said grinding tool means from the true involute generating motion.

9. A machine for grinding helical gear teeth comprising, in combination, a machine bed, tool supporting means mounted on said bed for pivotal movement about an axis perpendicular to the general plane of said bed, grinding tool means rotatably carried by said tool supporting means, a feed slide mounted on said bed for longitudinal movement parallel to the general plane of said bed towards and away from said tool supporting means, means for driving said feed slide, a frame mounted on said feed slide for movement longitudinally therewith and also relatively thereto transversely to the line of movement thereof, guide means adjustably associated with said bed for cooperation with said frame so as to cause the combined longitudinal and transverse movement thereof to follow a path forming an angle with the line of movement of said feed slide equal to the desired helix angle of the gear teeth being ground, a traversing slide mounted on said feed slide for movement relatively thereto and transversely to the line of movement thereof, driving means for reciprocating said traversing slide, work supporting means rotatably mounted on said traversing slide, a body having an at least partly cylindrical circumference and rotatably mounted on said traversing slide for imparting rotary movement to said work supporting means, tape holder means movably mounted on said frame, flexible tapes connected under tension between said tape holder means and the circumference of said body, cam means mounted on said frame, extensible coupling means for transmitting drive to said cam means from said traversing slide driving means, and transmission means operatively associated with said cam means and said tape holder means for causing periodic movement of the latter relatively to said frame to accelerate the rolling motion of said body along said tapes and cause the rolling motion of the work across said grinding tool means to deviate from the true involute generating motion.

10. A machine of the character claimed in claim 9, said cam means including at least two differently shaped cams, and a common support for said cams mounted on said frame for adjustment to bring said cams selectively into operative association with said transmission means.

11. A machine of the character claimed in claim 9, said transmission means including manually operable means for adjusting the ratio of transmission of movement from said cam means to said tape holder means.

12. A machine of the character claimed in claim 9, said transmission means including a spring-loaded device slidably mounted in said frame for movement by said spring loading in one direction and by said cam means in the opposite direction, and said tape holder means including arms pivotally connected to said frame and operatively engaged by said device so as to be rocked by the movement thereof in either direction.

13. A machine of the character claimed in claim 9, further comprising manually operable means for causing initial movement of said tape holder means relatively to said frame to bring the tooth flanks of the work into contact with said grinding tool means.

14. A machine for grinding helical gear teeth comprising, in combination, a machine bed, tool supporting means mounted on said bed for pivotal movement about an axis perpendicular to the general plane of said bed, grinding tool means rotatably carried by said tool supporting means, a feed slide mounted on said bed for longitudinal movement parallel to the general plane of said bed towards and away from said tool supporting means, means for driving said feed slide, a frame mounted on said feed slide for movement longitudinally therewith and also relatively thereto transversely to the line of movement thereof, guide means adjustably associated with said bed for cooperation with said frame so as to cause the combined longitudinal and transverse movement thereof to follow a path forming an angle with the line of movement of said feed slide equal to the desired helix angle of the gear teeth being ground, a traversing slide mounted on said feed slide for movement relatively thereto and transversely to the line of movement thereof, driving means for reciprocating said traversing slide, work supporting means rotatably mounted on said traversing slide, a body having an at least partly cylindrical circumference and rotatably mounted on said traversing slide for imparting rotary movement to said work supporting means, at least two tape holder arms pivotally connected to said frame, flexible tapes connected under tension between said tape holder arms and the circumference of said body, cam means mounted on said frame, extensible coupling means for transmitting drive to said cam means from said traversing slide driving means, a sleeve nonrotatably mounted in said fame for axial sliding movement with respect thereto, first resilient means urging said sleeve axially in one direction, a device for periodically transmitting movement from said cam means to said sleeve to move the latter axially in the opposite direction counter to said first resilient means, a shaft nonrotatably mounted within said sleeve for limited axial sliding movement with respect thereto, second resilient means cooperating with said sleeve and said shaft to cause the latter normally to move axially in unison with said sleeve, the ends of said shaft projecting from said sleeve and engaging said tape holder arms so that axial movement of said shaft in either direction causes rocking movement of said tape holder arms relatively to said frame to accelerate the rolling motion of said body along said tapes and cause the rolling motion of the work across said grinding tool means to deviate from the true involute generating motion, said shaft having a screw-threaded portion, and a nut mounted on said threaded shaft portion for manual rotation thereon but secured against axial movement relatively to said sleeve, said nut, when manually rotated, causing limited axial movement of said shaft with respect to said sleeve either counter to, or assisted by, said second resilient means, for initial rocking movement of said tape holder arms to adjust the work for operative engagement of its tooth flanks with said grinding tool means.

15. A machine of the character claimed in claim 14, said device including a two-armed lever fulcrumed on said frame and having one arm in engagement with said cam means for periodic operation thereby to cause rocking movement of said lever about its fulcrum, a coupling member adjustably carried by the other arm of said lever and engaging said sleeve for causing rocking movement of said lever about its fulcrum when said sleeve moves axially in said one direction, and for moving said sleeve axially in said opposite direction when said one lever arm is operated by said cam means, and manually operable means for adjusting the position of said coupling member on said other lever arm to vary the ratio of the effective lengths of said lever arms and, hence, the ratio of transmission of movement from said cam means to said sleeve.

16. A machine for grinding helical gear teeth comprising, in combination, a machine bed, tool supporting means mounted on said bed for pivotal movement about an axis perpendicular to the general plane of said bed, grinding tool means rotatably carried by said tool supporting means, a feed slide mounted on said bed for longitudinal movement parallel to the general plane of said bed towards and away from said tool supporting means, means for driving said feed slide, a frame mounted on said feed slide for movement longitudinally therewith and also relatively thereto transversely to the line of movement thereof, guide means adjustably associated with said bed for cooperation with said frame so as to cause the combined longitudinal and transverse movement thereof to follow a path forming an angle with the line of movement of said feed slide equal to the desired helix angle of the gear teeth being ground, a traversing slide mounted on said feed slide for movement relatively thereto and transversely to the line of movement thereof, driving means for reciprocating said traversing slide, work supporting means rotatably mounted on said traversing slide, a body having an at least partly cylindrical circumference and rotatably mounted on said traversing slide for imparting rotary movement to said work supporting means, at least two tape holder arms pivotally connected to said frame, flexible tapes connected under tension between said tape holder arms and the circumference of said body, a device slidably mounted in said frame and having opposed extremities thereof engaged by said tape holder arms, a shaft rotatably mounted in said frame, extensible coupling means for transmitting drive to said shaft from said traversing slide driving means, a hub member slidably keyed on said shaft, at least two differently shaped cams carried by said hub member, either of said cams being capable of being moved into an operative position by sliding said hub member on said shaft, and selectively variable-ratio transmission means including an element for engagement with one of said cams which is in operative position and an element for engagement with said device for periodically imparting sliding movement to said device to cause pivotal movement of said tape holder arms relatively to said frame and consequential acceleration of the rolling motion of said body along said tapes and deviation, by a selectively variable amount, of the rolling motion of the work across said grinding tool means from the true involute generating motion.

17. A gear grinding machine comprising, in combination, a machine bed, tool supporting means mounted on said bed for pivotal movement about an axis perpendicular to the general plane of said bed, grinding tool means rotatably carried by said tool supporting means, a feed slide mounted on said bed for longitudinal movement parallel to the general plane of said bed towards and away from said tool supporting means, means for driving said feed slide, a frame mounted on said feed slide for movement longitudinally therewith and also relatively thereto transversely to the line of movement thereof, guide means adjustably associated with said bed for cooperation with said frame and adapted, when set for grinding straight gear teeth, to cause no transverse movement of said frame and, when set for grinding helical gear teeth, to cause the combined longitudinal and transverse movement of said frame to follow a path forming an angle with the line of movement of said feed slide equal to the desired helix angle of the teeth being ground, a traversing slide mounted on said feed slide for movement relatively thereto and transversely to the line of movement thereof, driving means for reciprocating said traversing slide, work supporting means rotatably mounted on said traversing slide, a body having an at least partly cylindrical circumference and rotatably mounted on said traversing slide for imparting rotary movement to said work supporting means, at least two tape holder arms pivotally connected to said frame, flexible tapes connected under tension between said tape holder arms and the circumference of said body, said reciprocation of said traversing slide causing rolling motion of said body along said tapes and consequential true involute generating rolling motion of the work across said grinding tool means in the absence of pivotal movement of said tape holder arms on said frame, a device slidably mounted in said frame and having opposed extremities thereof engaged by said tape holder arms, a cam-actuating support movably and adjustably mounted on said frame, extensible coupling means for transmitting movement to said support from said traversing slide driving means, at least two differently shaped cams carried by said support for actuation thereby upon movement thereof by said driving means, said cams being selectively rendered operative by adjustment of said support, a two-armed lever including elements for engagement with the operative one of said cams and with said device for periodically imparting sliding movement thereto to cause pivotal movement of said tape holder arms on said frame and consequential acceleration of the rolling motion of said body along said tapes and deviation of the rolling of the work across said grinding tool means from the true involute generating motion, first manually operable means for adjusting the ratio of the effective lengths of the arms of said lever to vary the amount of sliding movement of said device and, hence, the amount of said deviation, and second manually operable means for causing initial sliding movement of said device independently of said cams, prior to commencement of a grinding operation, to cause pivotal movement of said tape holder arms on said frame and adjust the work for operative engagement of its tooth flanks with said grinding tool means.

WILLI GRAF.

REFERENCES CITED

The following references are of record in the file of this patent:

UNITED STATES PATENTS

| Number | Name | Date |
|---|---|---|
| 1,870,764 | Aeppli | Aug. 9, 1932 |
| 2,387,167 | Miller | Oct. 16, 1945 |
| 2,404,573 | Graf | July 23, 1946 |

FOREIGN PATENTS

| Number | Country | Date |
|---|---|---|
| 403,886 | Great Britain | Jan. 4, 1934 |

Certificate of Correction

Patent No. 2,486,020                                              October 25, 1949

WILLI GRAF

It is hereby certified that errors appear in the printed specification of the above numbered patent requiring correction as follows:

Column 6, line 4, for the word "came" read *cam*; column 12, line 66, after "rolling" insert *motion*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*